United States Patent
Mudgil et al.

(10) Patent No.: US 11,658,917 B2
(45) Date of Patent: May 23, 2023

(54) SELECTIVE OFFLOADING OF BANDWIDTH TO ENABLE LARGE-SCALE DATA INDEXING

(71) Applicant: Tekion Corp, San Ramon, CA (US)

(72) Inventors: Satyavrat Mudgil, Bengaluru (IN); Justin Hou, Pleasanton, CA (US); Ved Surtani, Bengaluru (IN)

(73) Assignee: Tekion Corp, San Ramon, CA (US)

( * ) Notice: Subject to any disclaimer, the term of this patent is extended or adjusted under 35 U.S.C. 154(b) by 0 days.

(21) Appl. No.: 17/226,335

(22) Filed: Apr. 9, 2021

(65) Prior Publication Data

US 2022/0329537 A1 Oct. 13, 2022

(51) Int. Cl.
*H04L 47/76* (2022.01)
*G06F 16/901* (2019.01)

(52) U.S. Cl.
CPC ............ *H04L 47/76* (2013.01); *G06F 16/901* (2019.01)

(58) Field of Classification Search
CPC ..... H04L 47/76; G06F 16/901; G06F 16/2343
See application file for complete search history.

(56) References Cited

U.S. PATENT DOCUMENTS

| | | | |
|---|---|---|---|
| 10,613,899 B1 * | 4/2020 | Saha | G06N 20/00 |
| 10,929,428 B1 * | 2/2021 | Brahmadesam | G06F 16/2379 |
| 11,093,497 B1 * | 8/2021 | Gupta | G06F 16/2343 |
| 11,334,543 B1 * | 5/2022 | Anwar | G06F 16/254 |
| 11,422,686 B2 * | 8/2022 | Filippi | G06F 3/04847 |
| 2013/0054815 A1 | 2/2013 | Chang et al. | |
| 2016/0055225 A1 | 2/2016 | Xu et al. | |
| 2017/0220651 A1 * | 8/2017 | Mathew | G06F 16/248 |
| 2018/0096045 A1 * | 4/2018 | Merriman | G06F 16/273 |
| 2018/0157522 A1 * | 6/2018 | Bafna | G06F 16/182 |
| 2018/0173744 A1 * | 6/2018 | Barbas | G06F 16/2365 |
| 2019/0363988 A1 * | 11/2019 | Dey | G06N 20/00 |
| 2020/0004658 A1 * | 1/2020 | Savir | G06F 11/3476 |
| 2020/0310884 A1 * | 10/2020 | Villalobos | G06F 16/909 |

FOREIGN PATENT DOCUMENTS

| | | |
|---|---|---|
| KR | 10-2015-0066575 A | 6/2015 |
| WO | WO 2011/160553 A1 | 12/2011 |
| WO | WO 2014/059394 A1 | 4/2014 |

OTHER PUBLICATIONS

International Search Report and Written Opinion, Patent Cooperation Treaty Application No. PCT/US2022/024018, dated Jul. 6, 2022, 8 pages.

* cited by examiner

*Primary Examiner* — Kevin T Bates
*Assistant Examiner* — Ranjan Pant
(74) *Attorney, Agent, or Firm* — Fenwick & West LLP (57) ABSTRACT

A system and a method are disclosed for receiving, by a server, based on input by a user, a request to lock a set of data. Responsively, the server modifies the set of data to be locked, and determines whether an amount of bandwidth required to index the locked data exceeds a threshold. Responsive to determining that the amount of bandwidth exceeds the threshold, the server instructs a secondary server to allocate bandwidth to index a first portion of the locked data. The server indexes a second portion of the locked data in parallel with the secondary server indexing the first portion of the locked data, and generates an index by collating the indexed first and second portions of the locked data. The server receives a search request for a portion of the locked data, and retrieves the portion of the locked data based on referencing the index.

20 Claims, 5 Drawing Sheets

502
receive, by a server, based on input by a user into a user interface, a request to lock a set of data

504
in response to receiving the request to lock the set of data, modify, by the server, the set of data to be read-only data, thereby causing the set of data to become locked data

506
determine, by the server, whether an amount of bandwidth required to index the locked data exceeds a threshold

508
responsive to determining that the amount of bandwidth exceeds the threshold, instruct a secondary server to allocate bandwidth to index a first portion of the locked data

510
index, by the server, a second portion of the locked data in parallel with the secondary server indexing the first portion of the locked data

512
generate an index by collating the indexed first portion of the locked data and the indexed second portion of the locked data

514
receive a search request for a portion of the locked data

516
retrieve the portion of the locked data based on referencing the index

FIG. 5

SELECTIVE OFFLOADING OF BANDWIDTH TO ENABLE LARGE-SCALE DATA INDEXING

TECHNICAL FIELD

The disclosure generally relates to the field of database management, and more particularly relates to using secondary servers on-demand to offload indexing large-scale data sets.

BACKGROUND

Existing on-premises systems that integrate data provide locked data integrations in static formats that cannot be granularly searched beyond the naked data within the integration. This is due to huge data sets being used to output the locked data integrations, where processing used by on-premises systems is inadequate to retain more than defined values for static variables based on underlying data, where the underlying data is then discarded or stored elsewhere.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment of a data management service facilitating access to locked data.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

CONFIGURATION OVERVIEW

One embodiment of a disclosed system, method and computer readable storage medium is disclosed herein for receiving, by a server, based on input by a user into a user interface, a request to lock a set of data. For example, a user may periodically (e.g., monthly) request to lock data that reflects activity during the period. The data may be data that is stored and managed using cloud resources, as opposed to being stored and managed on-premises of a conglomerate. In response to receiving the request to lock the set of data the server may modify the set of data to be read-only data, thereby causing the set of data to become locked data. This may be performed, e.g., to comply with an electronic policy that periodic data cannot be edited once closed.

The server may determine whether an amount of bandwidth required to index the locked data exceeds a threshold, and, responsive to determining that the amount of bandwidth exceeds the threshold, the server may instruct a secondary server to allocate bandwidth to index a first portion of the locked data. In an embodiment, determining, by the server, whether the amount of bandwidth required to index the locked data exceeds a threshold includes determining that the amount of bandwidth required to index the locked data exceeds the threshold responsive to determining that, in the course of indexing the locked data, the threshold amount of bandwidth has been used. For example, where the threshold is 90%, and memory usage toward indexing crosses 90%, the server may determine that the amount of bandwidth required to index the locked data exceeds the threshold.

In an embodiment, determining, by the server, whether the amount of bandwidth required to index the locked data exceeds a threshold may include, prior to indexing the locked data, the server determining an amount of bandwidth required to index the locked data, comparing the determined amount to the threshold, and determining whether the amount exceeds the threshold based on the comparison. That is, before the indexing process, an estimated amount of bandwidth required may be determined. In performing this process, the server may determine the amount of bandwidth required to index the locked data by inputting a representation of the locked data into a machine-learned model, and receiving as output from the machine-learned model an amount of bandwidth required to index the locked data. The server may instruct the secondary server to reserve the output amount of bandwidth required to index the locked data. The machine-learned model may have been trained using data-label pairs of a representation of data size from prior data sets as paired to an amount of bandwidth required to index the prior data sets.

The server may index a second portion of the locked data in parallel with the secondary server indexing the first portion of the locked data, and may generate an index by collating the indexed first portion of the locked data and the indexed second portion of the locked data. Following indexing, the server may receive a search request for a portion of the locked data, and may retrieve the portion of the locked data based on referencing the index.

Exemplary Data Management Service System Environment

Figure 1:
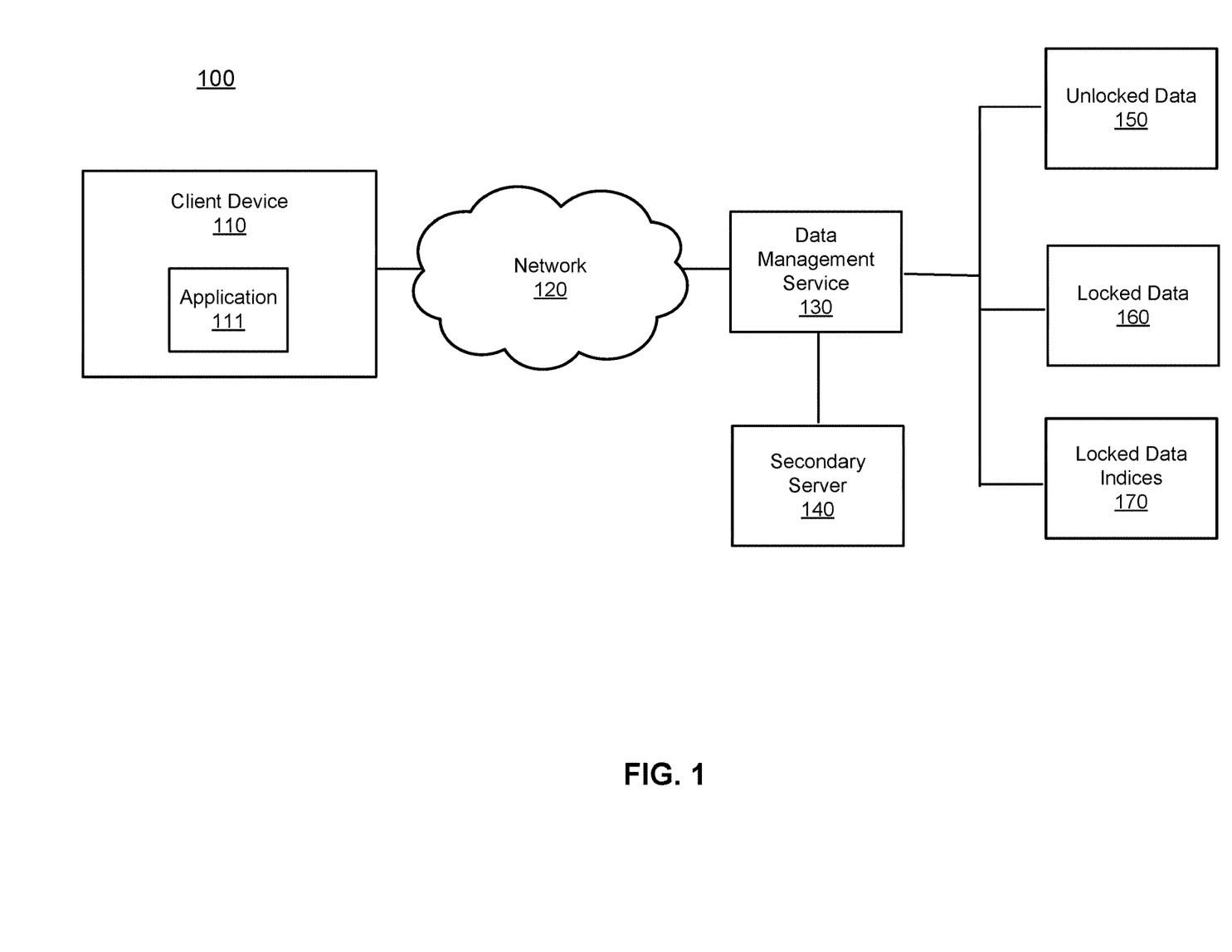

Figure (FIG. 1 illustrates one embodiment of a system environment of a data management service facilitating access to locked data. FIG. 1 depicts environment 100, which includes client device 110, application 111, network 120, data management service 130, secondary server 140, unlocked data 150, locked data 160, and locked data indices 170. Client device 110 may be any device having a user interface operable by a user to communicate with data management service 130. For example, client device 110 may be a mobile device (e.g., smartphone, laptop, tablet, personal digital assistant, wearable device, internet-of-things device, and so on), a larger device (e.g., a personal computer, kiosk, and so on), or any other device capable of operating application 111. Application 111 may be installed on client device 110, and may be used to interface a user of client device 110 with data management service 130. Application 111 may be a dedicated application, provided to client device 110 via data management service 130. Alternatively, application 111 may be a browser application through which a user may navigate to a portal to interface with data management service 130. Application 111 may perform some or all functionality of data management service 130 on-board client device 110. Further details about the functionality of application 111 will be described below with respect to search service 130.

Network 120 facilitates communication between client device 110 and search service 130. Network 120 may be any network, such as a local area network, a wideband network, the Internet, and any other type of network.

Data management service 130 facilitates a locking of unlocked data 150 based on a request from client device 110, converting unlocked data 150 into locked data 160. Data management service 130 also facilitates indexing the locked data, thus enabling a search mechanism. Data management service 130 may request indexing operations be performed by secondary server 140 in order to ensure sufficient bandwidth for performing the indexing operation (e.g., within a time constraint). Further details about the operation of data management service 130 are described below with reference to FIG. 2.

Secondary server 140 is accessed for additional processing bandwidth (e.g., computational resources, such as memory) in indexing locked data 160 responsive to the data becoming locked. Secondary server 140 receives instructions to index a portion of locked data 160 from data management service 130.

Unlocked data 150 includes data that is editable by users. For example, users may be members of a conglomerate. The users may edit the unlocked data 150 (e.g., adjust parameters within the data). Locked data 160 is formed responsive to a user requesting to lock a set of data. Following the above example, users may request to lock unlocked data 150 on a periodic or aperiodic (e.g., monthly) basis, thus generating a set of locked data 160 during each prescribed term. Locking may be performed, e.g., to provide a snapshot of data at different time points. Unlocked data 150 and locked data 160 may be stored on the same or different databases. While only one set of unlocked data 150 and locked data 160 is depicted, any number of sets of unlocked data 150 and locked data 160 are within the scope of this disclosure. A user may be prompted to lock data at pre-determined time intervals (e.g., on a monthly basis, or on any other periodic or aperiodic basis), or responsive to a condition being met, the condition being associated with a lock event.

Locked data indices 170 includes a plurality of indexes, each index referencing a set of locked data 160 (e.g., each index referring to data within a locked set of data corresponding to a given interval of time). Locked data indices 170 may be used by data management service 130 to provide custom data integrations to client device 110, the customization having been requested via application 111.

Exemplary Data Management Service Functionality

Figure 2:
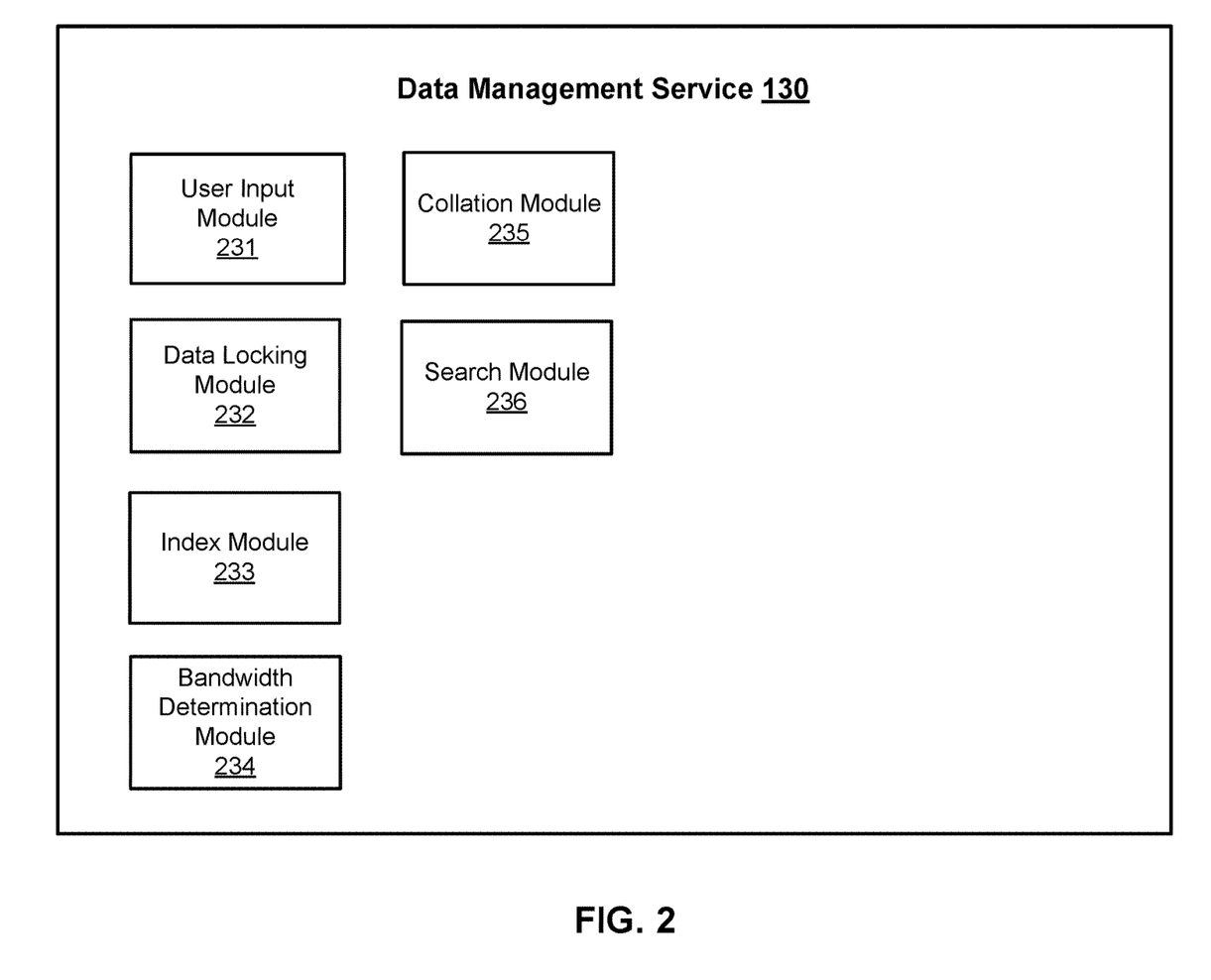
FIG. 2 illustrates one embodiment of exemplary modules used by the data management service.

FIG. 2 illustrates one embodiment of exemplary modules used by the data management service. As depicted in FIG. 2, data management service 130 includes user input module 231, data locking module 232, bandwidth determination module 233, index module 234, collation module 235, and search module 236. User input module 231 receives input from a user to lock a set of data. In an embodiment, user input module 231 prompts the user for input. For example, user input module 231 may determine whether a condition is met, and responsive to the condition being met, user input module 231 may prompt a user to provide input. An exemplary prompt may include a selectable option for locking a set of data. The set of data may be, for example, data populated between a last locking of data and a current time. Exemplary conditions may be time-based (e.g., a pre-defined amount of time, or a pre-defined date, has been reached). For example, a monthly prompt may occur on a certain date and/or time of the month. Exemplary conditions may be based on other metrics (e.g., a threshold amount of data has been populated, the threshold being at or within a predefined distance from a maximum amount of data that is to form a locked data set). In an embodiment, a prompt may indicate that data will be locked regardless of whether a selection of an option to lock the data is made. For example, a deadline may be indicated, where, at a certain time, the data will be locked, and user input module 231 may indicate the deadline in the prompt. In an embodiment, a deadline may exist, but is not included in such a prompt.

In an embodiment, user input module 231 may prompt the user with selectable options to lock a plurality of different sets of data, such as subsets of the unlocked data, or different discrete sets of unlocked data. Responsive to receiving a selection of each individual selectable option, its corresponding data may be locked (as is discussed with reference to data locking module 232).

In addition to prompting a user to, and receiving input from a user to, lock data, user input module 231 may receive a request from a user to generate an integration including the locked data. The integration may be configured to include any information desired by a user. User input module 231 may generate for display the data integration, and may modify the integration based on input from a user requesting further customizations. The data integration is generated based on one or more locked data sets indicated by the user via a user interface of application 111.

Data locking module 232 converts unlocked data 150 into locked data 160 responsive to detection of a locking condition. In an embodiment, data locking module 232 receives information from user input module 231 that a locking condition has occurred (e.g., a user has selected a selectable option to lock the data). In an embodiment, data locking module 232 may detect that a condition for locking unlocked data 150 has occurred (e.g., a threshold amount of data is included in unlocked data 150, a deadline has been reached, and the like), and responsively converts unlocked data 150 into locked data 160. In order to convert unlocked data 150 into locked data 160, data locking module 232 may convert the data into a read-only format. Data locking module 232 may apply additional security measures, such as encryption, password protection, and any other policy to prevent tampering by a user with locked data 160.

Index module 233 indexes the locked data by generating an index that maps memory addresses and/or search terms to portions of the data such that the data may be organized and searched in a granular and customizable fashion. In an embodiment, a constraint is applied, where indexing is to occur within a predefined interval of time. For example, where the locked data is to be used to generate a data integration, a lack of speed in indexing the data would delay the integration or otherwise be limited to only enabling the integration to be generated in a static format that cannot be searched.

Bandwidth determination module 234 may be a stand-alone module, or a sub-module of index module 233.

Bandwidth determination module 234 determines whether the amount of bandwidth required to index the locked data using a primary server exceeds a threshold amount of bandwidth. The term primary server, as used herein, whether used in the singular or plural, may refer to one or more servers under ambit of data management service 130 that are available in whole or in part to perform the indexing operation. The threshold amount of bandwidth may be a processing capacity of data management service 130 and/or may be an amount representative of the processing capacity of the primary server (e.g., 90% capacity). The threshold may be predefined by an administrator. The threshold may adjust dynamically based on other processing demands placed on data management service 130 at the time the integration generation is initiated. comprise instructions to determine that the amount of bandwidth required to index the locked data exceeds the threshold responsive to determining that, in the course of indexing the locked data, the threshold amount of bandwidth has been used.

In an embodiment, bandwidth determination module 234 determines, prior to beginning to index the locked data, an amount of bandwidth that is required to index the locked data. Bandwidth determination module compares this determined amount to the threshold, and determines whether the amount exceeds the threshold in response to the comparison. Determining the amount of bandwidth that is required to index the locked data may be performed in a variety of different ways. In an embodiment, bandwidth determination module 234 determines a size of the locked data, and determines therefrom an amount of bandwidth required to index that size of locked data (e.g., based on processing capabilities of data management service 130 and/or one or more servers allocated to index the locked data).

In an embodiment, determining the amount of bandwidth that is required to index the locked data may be performed using a machine learning model. Bandwidth determination module 234 may input a representation of the locked data into a machine-learned model. The representation of the locked data may include any signals associated with the locked data, including data of the locked data, metadata of the locked data, properties of the locked data (e.g., size, format, etc.), and so on. Optionally, signals associated with data management service 130 and/or the primary server may also be input into the machine-learned model (e.g., processing capacity, hardware information, current memory usage, and so on). Optionally, the time constraint may also be input into the machine-learned model. Bandwidth determination module 234 may receive as output from the machine-learned model an amount of bandwidth required to index the locked data, and may use this amount to perform the above-mentioned comparison. In an embodiment, rather than output an amount of bandwidth required to index the locked data, the machine-learned model may directly output an indication of whether data management service 130 and/or the primary server have the capacity to do so (and, additionally alternatively, a specific amount of bandwidth that will need to be allocated to another server in order to process the indexing ahead of the constraint).

The machine-learned model may be trained using data-label pairs of a representation of data size from prior data sets as paired to an amount of bandwidth required to index the prior data sets. In addition to data size, any other signals relating to the data, the processor, and the time constraint may also be paired to amounts of bandwidth required to index the prior data sets. As data sets are indexed, new training data may be added to a training set, and the machine-learned model may be re-trained in order to improve accuracy of prediction.

In an embodiment, bandwidth determination module 234 determines, while the primary server is indexing the locked data, that the threshold amount has been crossed. This may be without having performed an initial determination of an amount of bandwidth required to index the locked data. In such an embodiment, bandwidth determination module 234 determines, responsive to determining that the threshold amount has been crossed, that the amount of bandwidth required to index the locked data exceeds a processing capacity of data management service 130 and/or the primary server.

Index module 233, depending on the outcome of bandwidth determination module 234, may determine that a secondary server is required to timely index the locked data (timely being relative to the aforementioned constraint). The term secondary server, as used herein, regardless of whether used in the singular or in plural, may refer to one or more servers that are additional to the initially allocated one or more servers for indexing the data. The secondary server may be a third-party server, or may be one or more additional servers under the ambit of data management service 130. Where index module 233 determines that a secondary server is required, index module 233 instructs the secondary server to reserve additional bandwidth above and beyond the initially allocated one or more server's bandwidth to index the data and/or instructs the secondary server to begin indexing the locked data.

In an embodiment, index module 233 instructs the secondary server to index a particular portion of the locked data that is different from the portion of the locked data that is being indexed by the primary server. In an embodiment, the portions of data are selected on the relative processing capacity of the primary server as compared to additional bandwidth that will be required of the secondary server.

Collation module 235 collates the portions indexed by the primary and secondary server. Following collation, collation module 235 constructs a unified index that renders the locked data searchable. Collation module 235 may store the unified index to locked data indices 170. Search module 236 may output a user interface to a user (e.g., via application 111) that accepts parameters for search. The parameters may include, e.g. a specification or one or more locked data sets, as well as fields from the selected one or more locked data sets that are to be searched. Search module 236 references locked data indices 170 to determine memory addresses of data matching the input parameters, and outputs a customized integration to client device 110 based on the input parameters.

Figure 3:
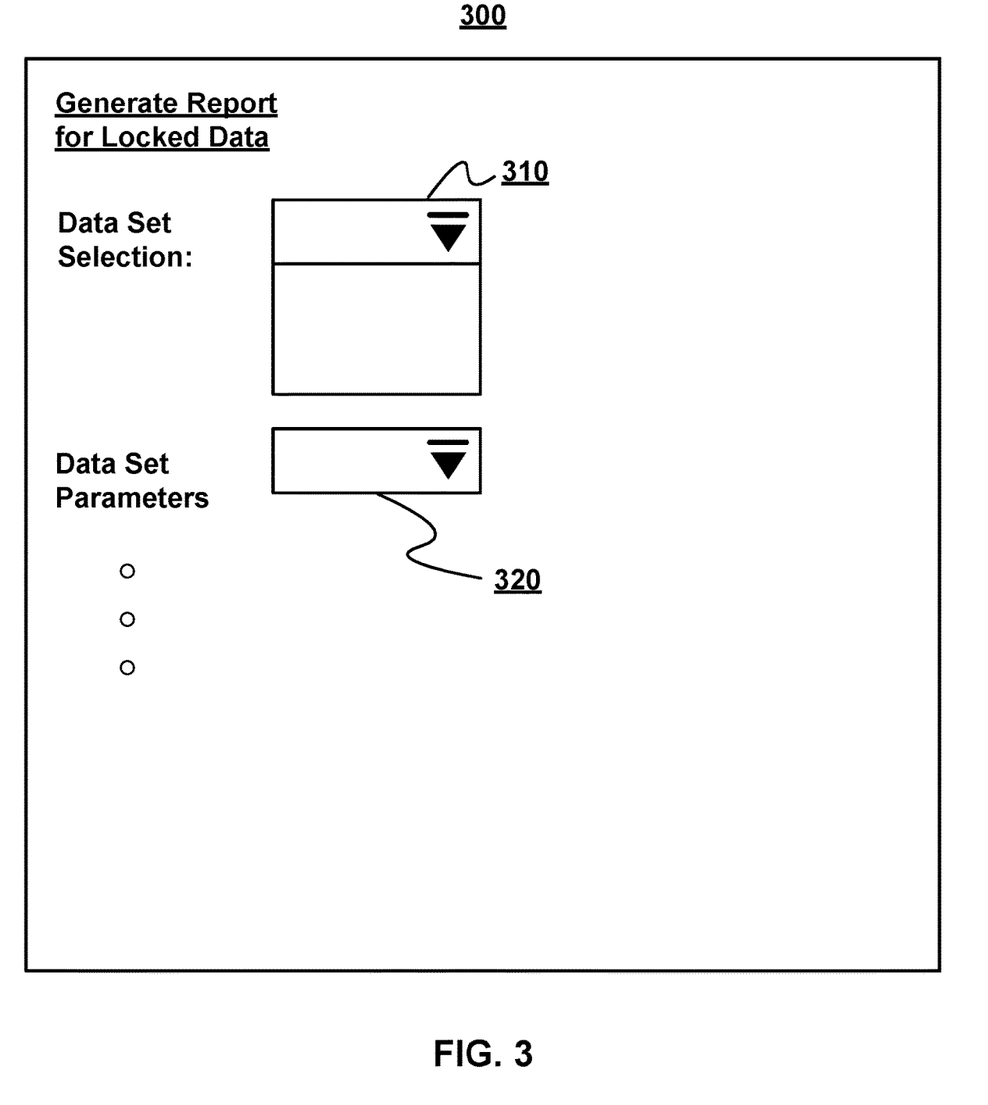
FIG. 3 illustrates one embodiment of a user interface operable by a client device to communicate information to the search service.

FIG. 3 illustrates one embodiment of a user interface operable by a client device to communicate information to the search service. User interface 300 may be output using application 111 of client device 110, and may be used to generate a custom integration of locked data that is indexed by data management service 130. User interface 300 may include selectable options for selecting various parameters. Data set selection option 310 enables a user to select one or more locked data sets from which to generate the data integration. For example, where data is locked on a monthly basis, month options may be available for selection via data set selection option 310. Data set parameters option 320 may include selectable options for selecting fields to be included in the custom data integration. The selectable options may dynamically populate depending on the data set selected (e.g., where some candidate fields are inapplicable to a given data set and thus omitted). This results in an improved user interface based on application usage, resulting in a more efficient set of options displayed to a user for navigating creation of a custom data integration.

Computing Machine Architecture

Figure 4:
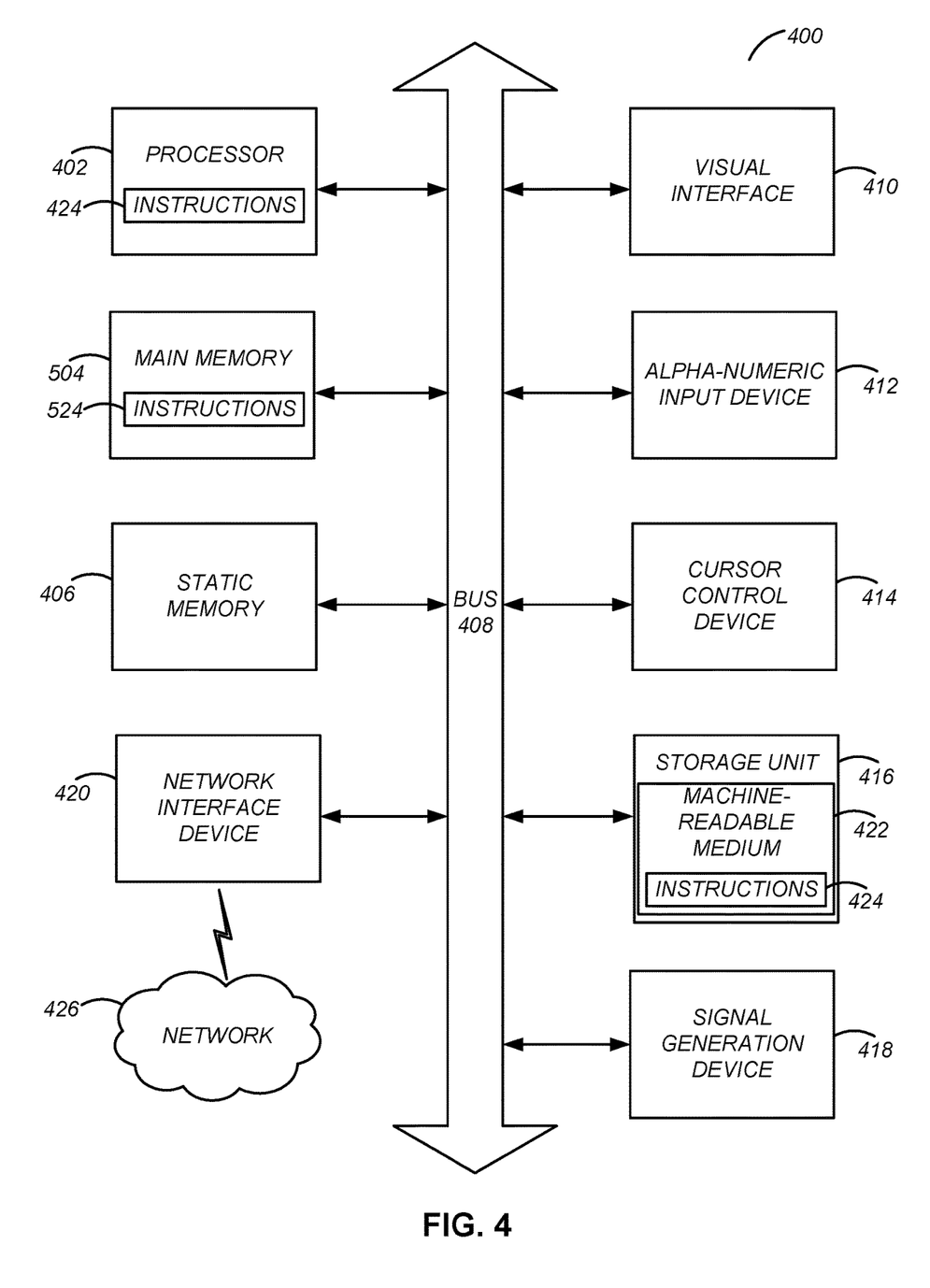
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Indexing Process

Figure 5:
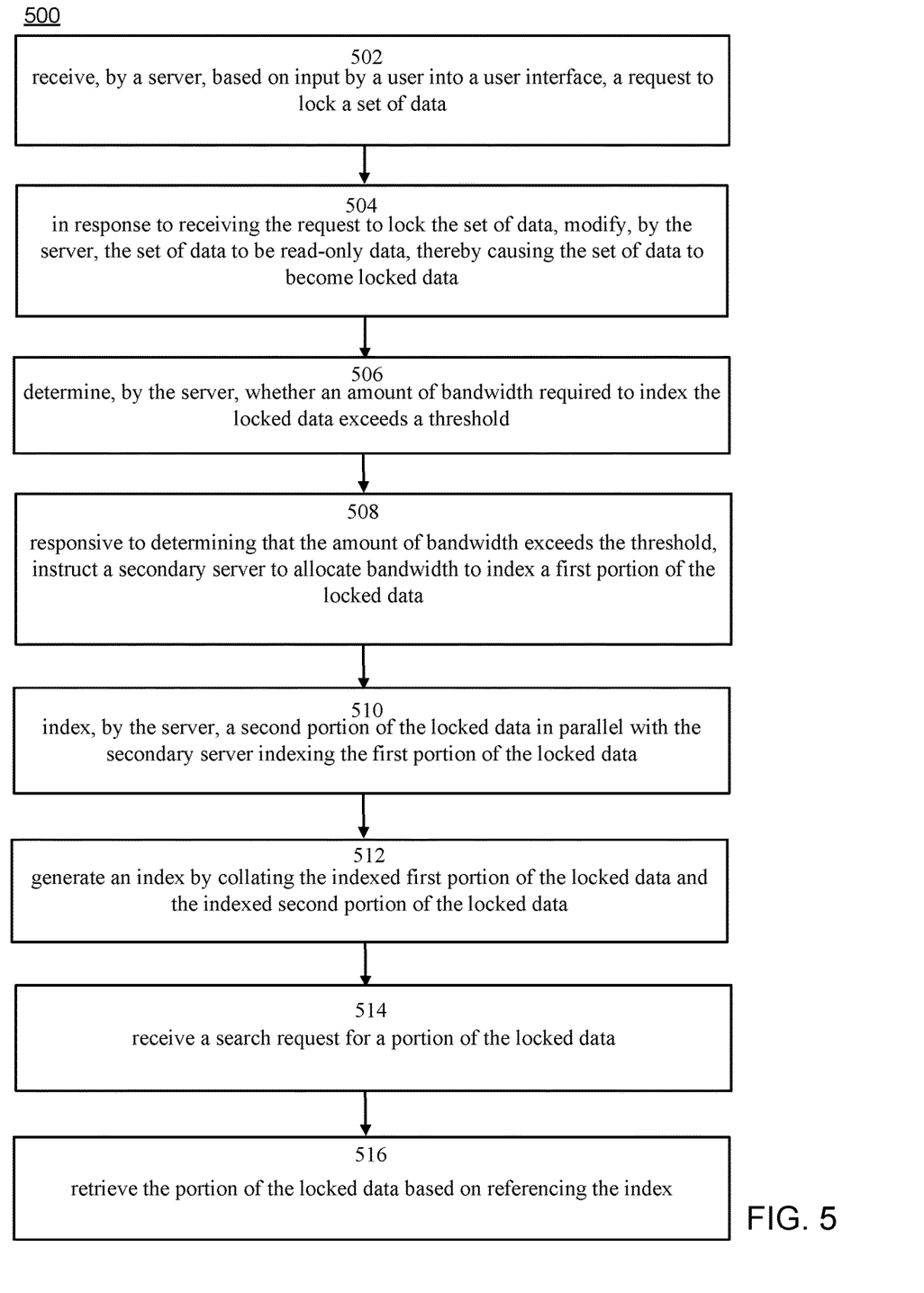
FIG. 5 illustrates one embodiment of an exemplary flowchart for a process for generating and providing for display integrated data from multiple aggregations.

FIG. 5 illustrates one embodiment of an exemplary flowchart for a process for generating and providing for display integrated data from multiple aggregations. Process 500 begins with a server (e.g., a primary server of data management service 130) receiving 502, based on input by a user into a user interface (e.g., user interface 300), a request to lock a set of data (e.g., unlocked data 150). For example, a set of data representing data for a prior month may be requested to be locked. In response to receiving the request to lock the set of data, the primary server modifies 504 the set of data to read-only data (e.g., using data locking module 232), thereby causing the set of data to become locked data (e.g., locked data 160);

The primary server determines 506 whether an amount of bandwidth required to index the locked data exceeds a threshold (e.g., using bandwidth determination module 234). Responsive to determining that the amount of bandwidth exceeds the threshold, the primary server instructs 508 a secondary server to allocate bandwidth to index a first portion of the locked data (e.g., using index module 233). The primary server indexes 510 a second portion of the locked data in parallel with the secondary server indexing the first portion of the locked data (e.g., thus improving speed with which the data is indexed by having at least two servers indexing respective portions of the data at a same time).

The primary server generates 512 an index by collating the indexed first portion of the locked data and the indexed second portion of the locked data (e.g., using collation module 235). The primary server receives 514 a search request for a portion of the locked data (e.g., via user interface 300, as operated by client device 110 using application 111). The primary server retrieves 516 the portion of the locked data based on referencing the index (e.g., using parameters input into user interface 300 to determine which portions of the index to reference).

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for indexing large sets of locked data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:

receive, by a server, based on input by a user into a user interface, a request to lock a set of data that is not indexed, the set of data received over a range of time since a last set of data was indexed and not indexed during the range of time;

in response to receiving the request to lock the set of data, modify, by the server, the set of data that is not indexed to be read-only data, thereby causing the set of data that is not indexed to become locked data in connection with readying the set of data that is not indexed to be indexed;

determine, by the server, whether an amount of bandwidth required to index the locked data exceeds a threshold;

responsive to determining that the amount of bandwidth exceeds the threshold, instruct a secondary server to allocate bandwidth to index a first portion of the locked data;

index, by the server, a second portion of the locked data in parallel with the secondary server indexing the first portion of the locked data;

generate an index by collating the indexed first portion of the locked data and the indexed second portion of the locked data;

receive a search request for a portion of the locked data; and retrieve the portion of the locked data based on referencing the index.

2. The non-transitory computer-readable medium of claim 1, wherein the instructions to determine, by the server, whether the amount of bandwidth required to index the locked data exceeds a threshold comprise instructions to determine that the amount of bandwidth required to index the locked data exceeds the threshold responsive to determining that, in the course of indexing the locked data, the threshold amount of bandwidth has been used.

3. The non-transitory computer-readable medium of claim 1, wherein the instructions to determine, by the server, whether the amount of bandwidth required to index the locked data exceeds a threshold comprise instructions to:

prior to indexing the locked data, determine an amount of bandwidth required to index the locked data;

compare the determined amount to the threshold; and determine whether the amount exceeds the threshold based on the comparison.

4. The non-transitory computer-readable medium of claim 3, wherein the instructions to determine the amount of bandwidth required to index the locked data comprise instructions to:

input a representation of the locked data into a machine-learned model; and receive as output from the machine-learned model an amount of bandwidth required to index the locked data.

5. The non-transitory computer-readable medium of claim 4, wherein the instructions further comprise instructions to instruct, by the server, the secondary server to reserve the output amount of bandwidth required to index the locked data.

6. The non-transitory computer-readable medium of claim 4, wherein the machine-learned model was trained using data-label pairs of a representation of data size from prior data sets as paired to an amount of bandwidth required to index the prior data sets.

7. The non-transitory computer-readable medium of claim 1, wherein the set of data is stored using cloud storage remote from a client device of the user.

8. A method comprising:
  receiving, by a server, based on input by a user into a user interface, a request to lock a set of data that is not indexed, the set of data that is not indexed received over a range of time since a last set of data was indexed and not indexed during the range of time;
  in response to receiving the request to lock the set of data, modifying, by the server, the set of data that is not indexed to be read-only data, thereby causing the set of data that is not indexed to become locked data in connection with readying the set of data that is not indexed to be indexed;
  determining, by the server, whether an amount of bandwidth required to index the locked data exceeds a threshold;
  responsive to determining that the amount of bandwidth exceeds the threshold, instructing a secondary server to allocate bandwidth to index a first portion of the locked data;
  indexing, by the server, a second portion of the locked data in parallel with the secondary server indexing the first portion of the locked data;
  generating an index by collating the indexed first portion of the locked data and the indexed second portion of the locked data;
  receiving a search request for a portion of the locked data; and
  retrieving the portion of the locked data based on referencing the index.

9. The method of claim 8, wherein determining, by the server, whether the amount of bandwidth required to index the locked data exceeds a threshold comprises determining that the amount of bandwidth required to index the locked data exceeds the threshold responsive to determining that, in the course of indexing the locked data, the threshold amount of bandwidth has been used.

10. The method of claim 8, wherein determining, by the server, whether the amount of bandwidth required to index the locked data exceeds a threshold comprises:
  prior to indexing the locked data, determining an amount of bandwidth required to index the locked data;
  comparing the determined amount to the threshold; and
  determining whether the amount exceeds the threshold based on the comparison.

11. The method of claim 10, wherein determining the amount of bandwidth required to index the locked data comprises:
  inputting a representation of the locked data into a machine-learned model; and
  receiving as output from the machine-learned model an amount of bandwidth required to index the locked data.

12. The method of claim 11, further comprising instructing, by the server, the secondary server to reserve the output amount of bandwidth required to index the locked data.

13. The method of claim 11, wherein the machine-learned model was trained using data-label pairs of a representation of data size from prior data sets as paired to an amount of bandwidth required to index the prior data sets.

14. The method of claim 8, wherein the set of data is stored using cloud storage remote from a client device of the user.

15. A system comprising:
  memory with instructions encoded thereon; and
  one or more processors that, when executing the instructions, are caused to perform operations comprising:
    receiving, by a server, based on input by a user into a user interface, a request to lock a set of data that is not indexed, the set of data received over a range of time since a last set of data was indexed and not indexed during the range of time;
    in response to receiving the request to lock the set of data that is not indexed, modifying, by the server, the set of data that is not indexed to be read-only data, thereby causing the set of data to become locked data in connection with readying the set of data that is not indexed to be indexed;
    determining, by the server, whether an amount of bandwidth required to index the locked data exceeds a threshold;
    responsive to determining that the amount of bandwidth exceeds the threshold, instructing a secondary server to allocate bandwidth to index a first portion of the locked data;
    indexing, by the server, a second portion of the locked data in parallel with the secondary server indexing the first portion of the locked data;
    generating an index by collating the indexed first portion of the locked data and the indexed second portion of the locked data;
    receiving a search request for a portion of the locked data; and
    retrieving the portion of the locked data based on referencing the index.

16. The system of claim 15, wherein determining, by the server, whether the amount of bandwidth required to index the locked data exceeds a threshold comprises determining that the amount of bandwidth required to index the locked data exceeds the threshold responsive to determining that, in the course of indexing the locked data, the threshold amount of bandwidth has been used.

17. The system of claim 15, wherein determining, by the server, whether the amount of bandwidth required to index the locked data exceeds a threshold comprises:
  prior to indexing the locked data, determining an amount of bandwidth required to index the locked data;
  comparing the determined amount to the threshold; and
  determining whether the amount exceeds the threshold based on the comparison.

18. The system of claim 17, wherein determining the amount of bandwidth required to index the locked data comprises:
  inputting a representation of the locked data into a machine-learned model; and
  receiving as output from the machine-learned model an amount of bandwidth required to index the locked data.

19. The system of claim 18, wherein the operations further comprise instructing, by the server, the secondary server to reserve the output amount of bandwidth required to index the locked data.

20. The system of claim 18, wherein the machine-learned model was trained using data-label pairs of a representation of data size from prior data sets as paired to an amount of bandwidth required to index the prior data sets.

* * * * *